US012653144B2

(12) United States Patent
Drew et al.

(10) Patent No.: US 12,653,144 B2
(45) Date of Patent: Jun. 16, 2026

(54) APPARATUS, SYSTEM AND METHOD FOR DELIVERY AND PRESENTATION OF TURF FOR PET TOILETRY

(71) Applicant: Potty Plant Pty Ltd, Sydney (AU)

(72) Inventors: Morgan Drew, Sydney (AU); Julia Sakr, Sydney (AU); Campbell Smyth, Sydney (AU)

(73) Assignee: POTTY PLANT PTY LTD., Bondi Beach (AU)

( * ) Notice: Subject to any disclaimer, the term of this patent is extended or adjusted under 35 U.S.C. 154(b) by 0 days.

(21) Appl. No.: 18/814,943

(22) Filed: Aug. 26, 2024

(65) Prior Publication Data

US 2025/0064012 A1 Feb. 27, 2025

(30) Foreign Application Priority Data

Aug. 25, 2023 (AU) ................................. 2023902737

(51) Int. Cl.
A01K 1/015 (2006.01)

(52) U.S. Cl.
CPC .......... A01K 1/0155 (2013.01); A01K 1/0157 (2013.01)

(58) Field of Classification Search
CPC .. A01K 1/0155; A01K 1/0157; A01K 1/0152; A01K 1/015; A01K 1/0107; A01K 1/0125
See application file for complete search history.

(56) References Cited

U.S. PATENT DOCUMENTS

| | | | | |
|---|---|---|---|---|
| 4,813,376 A * | 3/1989 | Kaufman | ............. | A01K 1/0125 119/168 |
| 5,144,914 A * | 9/1992 | Giannakopoulos | .. | A01K 1/0107 119/168 |
| 5,566,641 A * | 10/1996 | Radli | ................... | A01K 1/0125 119/168 |
| 5,845,601 A * | 12/1998 | Robinson | ............. | A01K 1/0125 119/168 |
| 6,382,131 B1 * | 5/2002 | McGivern | ............ | A01K 1/0125 119/168 |
| 6,487,990 B1 * | 12/2002 | McNew | ............... | A01K 1/0125 119/168 |
| 10,820,567 B2 * | 11/2020 | Garrett | ................... | B65D 5/321 |
| 12,137,667 B2 * | 11/2024 | Wu | ...................... | A01K 1/0125 |
| 2009/0241851 A1 * | 10/2009 | Peddycoart | .......... | A01K 1/0107 119/168 |
| 2014/0338608 A1 * | 11/2014 | Williams | ............. | A01K 1/0125 119/168 |
| 2016/0198673 A1 * | 7/2016 | Waid | ................... | A01K 1/0114 119/167 |

* cited by examiner

*Primary Examiner* — Trinh T Nguyen
(74) *Attorney, Agent, or Firm* — INNOVATION CAPITAL LAW GROUP, LLP; Vic Lin

(57) ABSTRACT

The invention relates to a turf transport and presentation apparatus, system and method for pet toiletry and a container blank configured to form the apparatus. The apparatus includes a first container portion and a second container portion and a joining portion connecting the first and second container portions together, wherein the container portions are configured to open and close in the manner of a clamshell. In a closed condition the container portions form a cavity for holding a rolled or folded turf sheet for storage and/or transport and in an open condition, the apparatus forms a tray for supporting a turf sheet in a lay-flat condition.

19 Claims, 7 Drawing Sheets

APPARATUS, SYSTEM AND METHOD FOR DELIVERY AND PRESENTATION OF TURF FOR PET TOILETRY

TECHNICAL FIELD

The present invention relates to an apparatus for the delivery and presentation of turf or sod for pet toiletry.

BACKGROUND

Generally speaking, most pets would prefer to relieve themselves on or near grass. Over time, pets have been increasingly integrated into the lives of the general population. Many of pet owners have that have limited time, space, environment and or location to ensure their pets are able to relieve themselves in a suitable and comfortable place.

There are a variety of options available to people with such limitations including absorbent pads and bulky mats with and without drainage solutions. Delivery and transportation of some products may be difficult, cumbersome and costly for producers and consumers. Replacement and disposal of such products can be messy and difficult.

Furthermore, some pets may prefer or may be accustomed to excreting urine and/or faeces on natural grass and may be reluctant to do so on artificial absorbent pads or mats. However, some pet owners may reside in dwellings, such as apartments, that will not accommodate the permanent installation of natural grass due to space, drainage, natural light or other constraints.

Accordingly, a need exists for a natural grass pet toileting solution for pet owners residing in dwellings that cannot accommodate permanent installation of natural grass.

SUMMARY OF THE INVENTION

Accordingly, in one aspect, the present invention provides a turf transport and presentation apparatus for pet toiletry, the apparatus comprising:

a first container portion and a second container portion, each of the first and the second container portions comprising a base and a wall upstanding from the base;

a joining portion connecting the first and second container portions together, wherein the joining portion includes a panel connected with a lateral edge of the base of each of the container portions and intermediate wall portions connected with the walls of each of the container portions; and a turf sheet for being laid across the first container portion, the second container portion and the joining portion;

wherein the first and second container portions are adapted to pivot relative to each other about the joining portion between a first configuration in which the first and second container portions are closed together whereby the bases and upstanding walls of the first and second container portions and the panel of the joining portion define a cavity for containing a sheet of turf for storage and/or transport and a second configuration in which the first and second container portions are opened apart whereby the bases and the upstanding walls of the first and second container portions and the panel and intermediate wall portions of the joining portion provide a unitary planar base surrounded by a unitary upstanding wall.

Preferably, the unitary planar base and the surrounding unitary upstanding wall define a tray in the second configuration.

Preferably, the first container portion, the second container portion and the joining portion define a clamshell container in the first configuration.

Preferably, the intermediate wall portions upstand from opposite ends of the panel and adjoin the walls of each of the container portions along join lines, wherein the intermediate wall portions each include diagonal fold lines extending from a junction between the join lines and the base of a respective first or second container portion, whereby portions of the intermediate wall portions either side of the diagonal fold lines fold over each other to form gussets when the apparatus is in the second configuration.

Preferably, the portions of the intermediate wall portions either side of the diagonal fold lines unfold from over each other gussets when the apparatus assumes the first configuration whereby the intermediate wall portions assume a planar configuration upstanding from the panel to form together with the walls of each of the container portions to form the unitary upstanding wall surrounding the unitary planar base.

Preferably, the diagonal fold lines extend at about 45 degrees relative to the join lines between opposite ends of the panel and the adjoining walls of each of the container portions.

Preferably, the wall joint portion is collapsible so as to be substantially coplanar to the surface of the joining portion.

Preferably, the upstanding walls of the first and second container portions are each comprised of a first upstanding panel, a second upstanding panel spaced apart and substantially parallel to the first upstanding panel, and an intermediate panel adjoining and extending between the first and second upstanding panels thereby forming a channel comprising an open box shaped profile.

Preferably, the upstanding walls of the first and second container portions each include openings for use as hand holds.

Preferably, the openings are positioned on each of the upstanding walls of the first and second container portions closely opposite and in alignment with each other when the first and second container portions in the first configuration.

Preferably, openings for use as hand holds are located within one of the first and second upstanding panels.

Preferably, the apparatus further comprises one or more spacers and/or inserts.

Preferably, the one or more spacers and/or inserts increase the rigidity of the apparatus in the first configuration.

Preferably, the one or more spacers and/or inserts are locatable to position the turf sheet within the cavity in the first configuration.

Preferably, the apparatus further includes a waterproof and/or water-resistant sleeve for containing the turf sheet within the cavity.

Preferably, the first container portion and the second container portion are releasably secured together in the first configuration.

Preferably, the material forming the container is cardboard and preferably includes a waterproof or water-resistant material or coating.

In another aspect, the present invention provides a container blank for forming the turf transport and presentation apparatus in accordance with the first aspect of the invention described above and preferably any of the embodiments described and illustrated herein.

In another aspect, the present invention provides a method of deploying a sheet of turf for presentation for pet toiletry, the method comprising:

separating a first container portion from a second container portion;

moving one of the first container portion or the second container portion in an arcuate motion to move locate the respective first container portion or the second container portion into a common plane with the other of the first container portion or the second container portion;

laying out the turf sheet across the first container portion, the second container portion and a joining portion connecting the first container portion and the second container portion.

In yet another aspect, the present invention provides a turf transport and presentation system for pet toiletry, the system including a container comprising:

a first container portion and a second container portion, each of the first and the second container portions comprising a base and a wall upstanding from the base;

a joining portion connecting the first and second container portions together, wherein the joining portion includes a panel connected with a lateral edge of the base of each of the container portions and intermediate wall portions connected with the walls of each of the container portions; and a turf sheet for being laid across the first container portion, the second container portion and the joining portion;

wherein the first and second container portions are adapted to pivot relative to each other about the joining portion between a first configuration in which the first and second container portions are closed together whereby the bases and upstanding walls of the first and second container portions and the panel of the joining portion define a cavity containing a rolled or folded sheet of turf for storage and/or transport and a second configuration in which the first and second container portions are opened apart whereby the bases and the upstanding walls of the first and second container portions and the panel and intermediate wall portions of the joining portion provide a unitary planar base surrounded by a unitary upstanding wall, wherein the turf sheet is opened up and laid flat on the planar base.

BRIEF DESCRIPTION OF THE DRAWINGS

The present invention will now be described in more detail with reference to preferred embodiments illustrated in the accompanying figures, wherein.

DETAILED DESCRIPTION OF PREFERRED EMBODIMENTS

Figure 1:
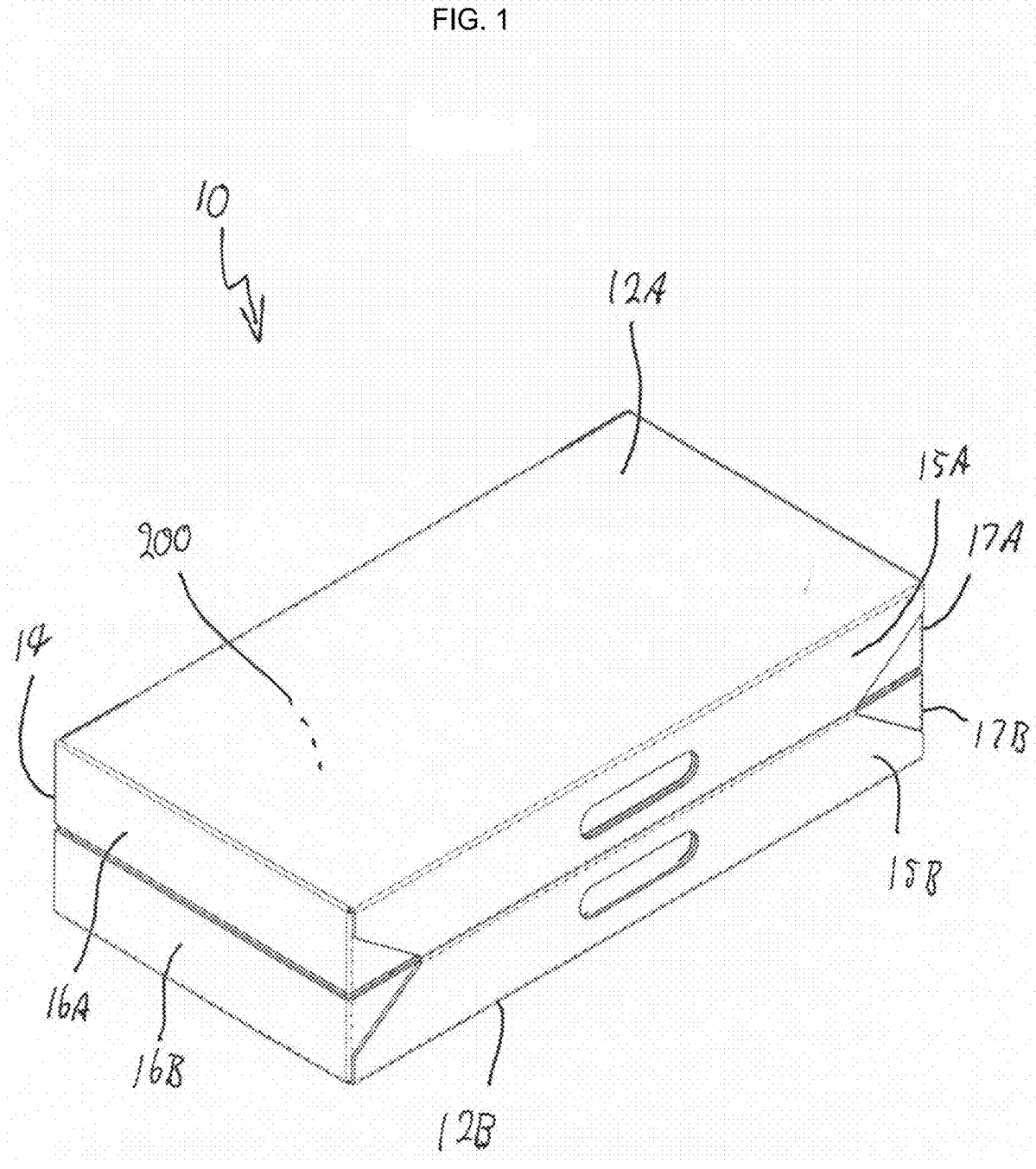
FIG. 1 is an apparatus in the transportable configuration according to an embodiment of the present invention including a first container portion, a second container portion and a joining portion connecting the first and second container portions together, wherein the first and second container portions are in a first (i.e. closed) configuration.
Figure 3:
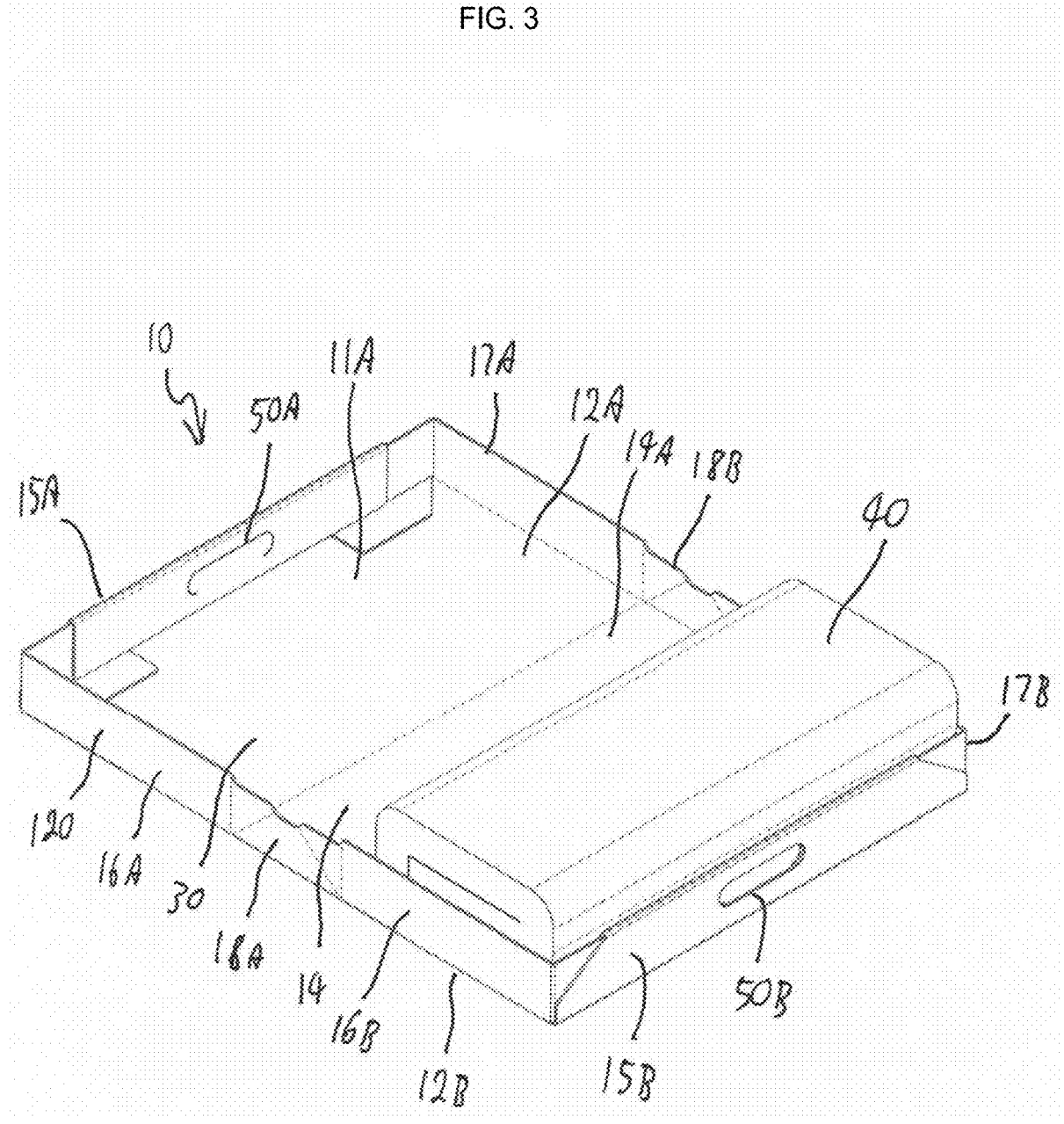
FIG. 3 is the apparatus of FIG. 2 wherein the insert and the spacer are removed.
Figure 4:
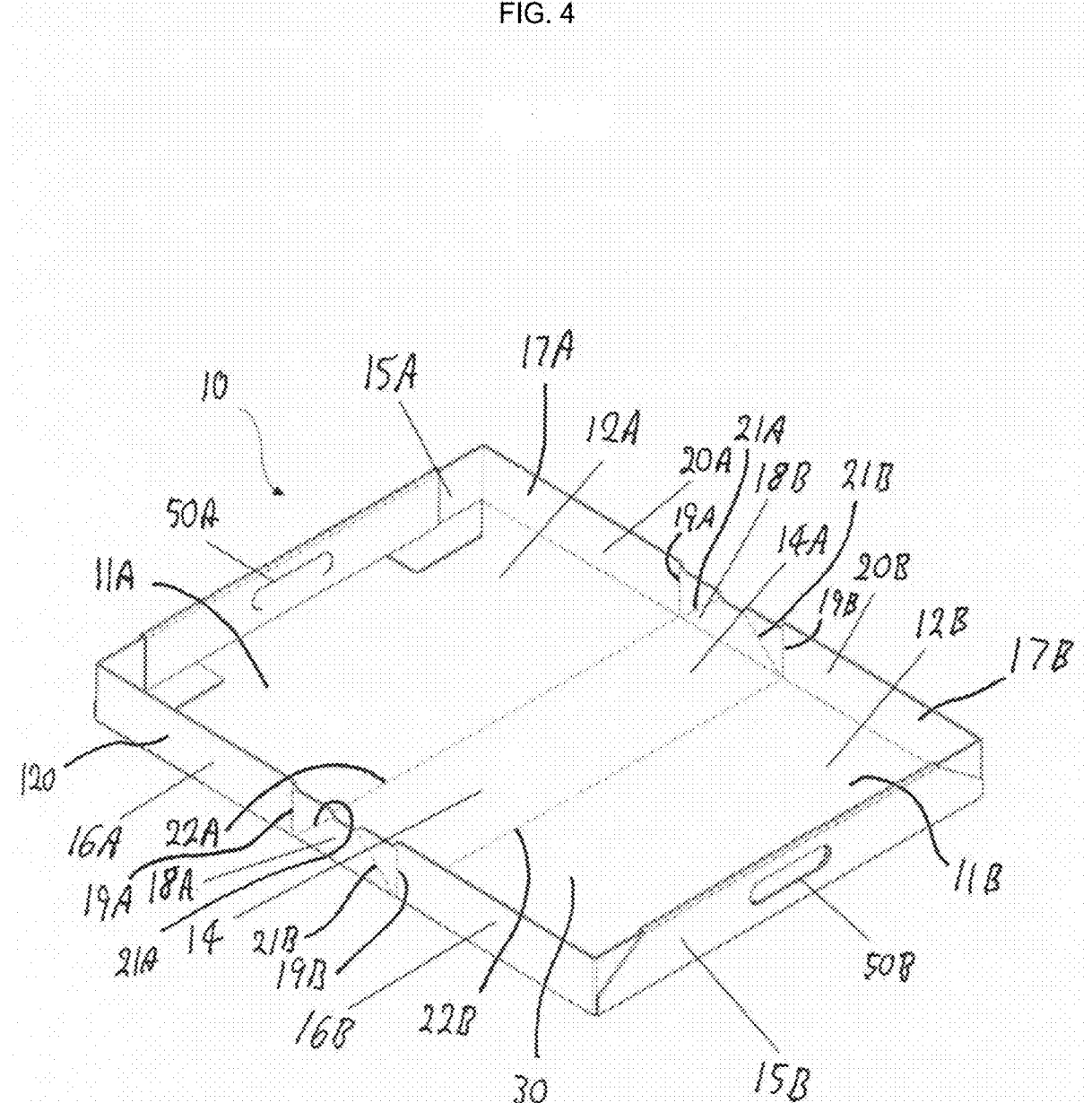
FIG. 4 is the apparatus of FIG. 1 in the second (i.e. open) configuration with the turf sheet removed.
Figure 5:
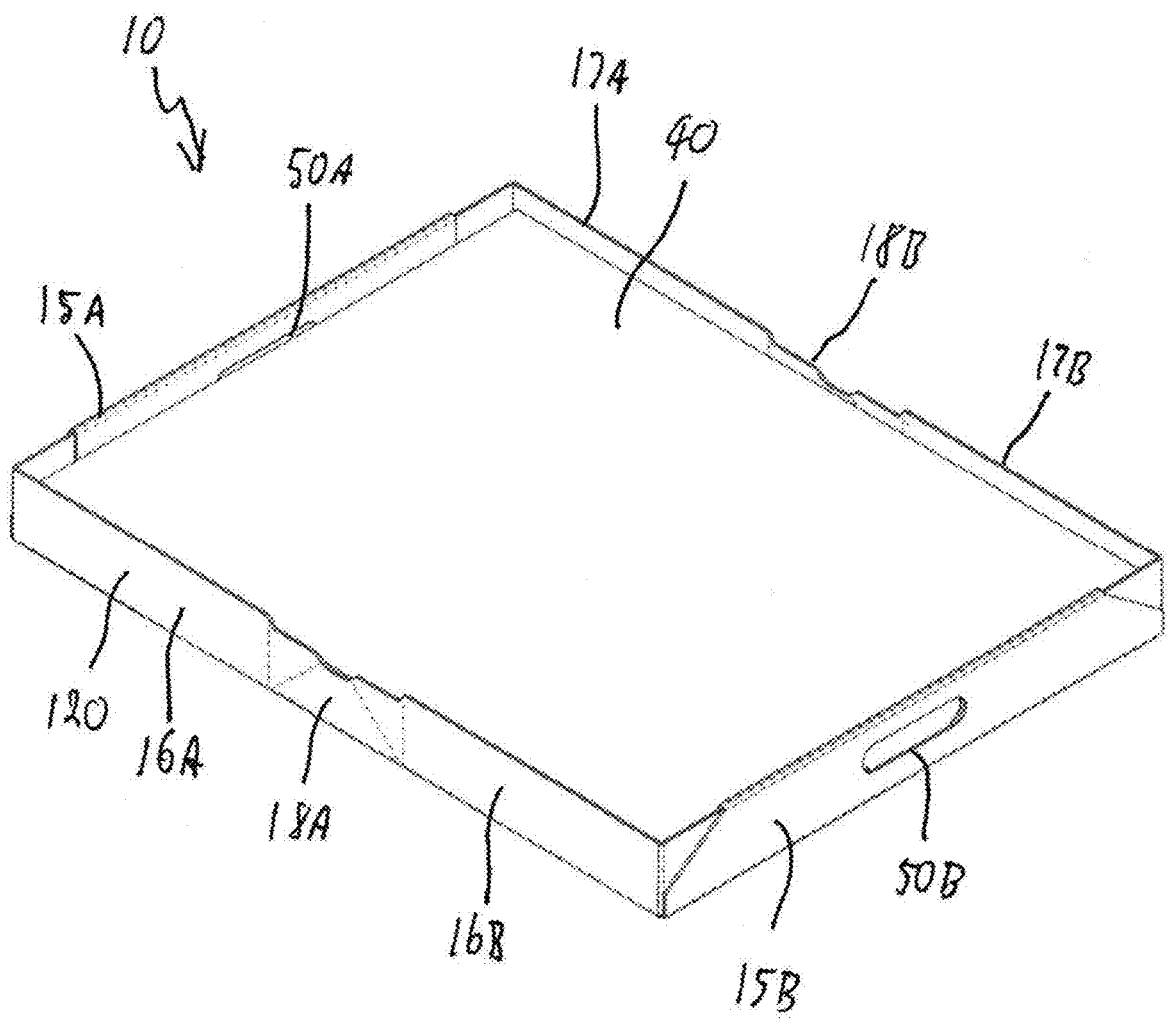
FIG. 5 is the apparatus of FIG. 4 in a deployed configuration with the turf sheet laid across the tray.

FIGS. 1 through 5 illustrate an apparatus 10 for the delivery and presentation of turf for pet toiletry, the apparatus 10 initially in a transportable configuration as illustrated in FIG. 1 transitioning to a deployed configuration as illustrated in FIG. 5.

The apparatus 10 comprises a first container portion 12A and a second container portion 12B. In the preferred embodiment, the first container portion 12A and the second container portion 12B are substantially symmetrical.

Each of the container portions 12A, 12B comprise a respective base 11A, 11B and a respective wall 20A, 20B upstanding from the base 11A, 11B. The base 11A, 11B illustrated in the Figures is rectangular but it in another embodiment the base 11A, 11B is square. Each wall 20A, 20B is comprised of a lateral wall portion 15A, 15B upstanding from a lateral edge of each base 11A, 11B and a pair of opposing end wall portions 16A, 17A, 16B, 17B upstanding from opposite end edges of each base 11A, 11B.

Opposite ends of each lateral wall portions 15A, 15B are connected with ends of each opposite pair of end wall portions 16A, 16B, 17A, 17B, whereby the walls 20A, 20B, in plan view, are formed in a U-shape with square corners.

The apparatus 10 further comprises a joining portion 14. The joining portion 14 is comprised of a panel 14A having a generally rectangular shape with opposing lateral sides edges joined along join lines 22A, 22B with lateral edges of each base 11A, 11B opposite to the edges from which the lateral wall portions 15A, 15B upstand. The joining portion 14 thereby connects the first and second container portions 12A, 12B together.

The joining portion 14 further includes intermediate wall portions 18A, 18B upstanding from opposite ends of the panel 14A. The intermediate wall portions 18A, 18B are located between the end wall portions 16A, 16B, 17A, 17B and lateral edges of the intermediate wall portions 18A, 18B adjoin the end wall portions 16A, 16B, 17A, 17B along join lines 19A, 19B. The intermediate wall portions 18A, 18B include diagonal fold lines 21A, 21B extending from the junction between the join lines 19A, 19B and each base 11A, 11B. The fold lines 21A, 21B extend diagonally inwardly towards each other and terminate at free upper edge of the intermediate wall portions 18A, 18B. The fold lines 21A, 21B extend preferably at about 45 degrees from the join lines 19A, 19B.

Figure 7:
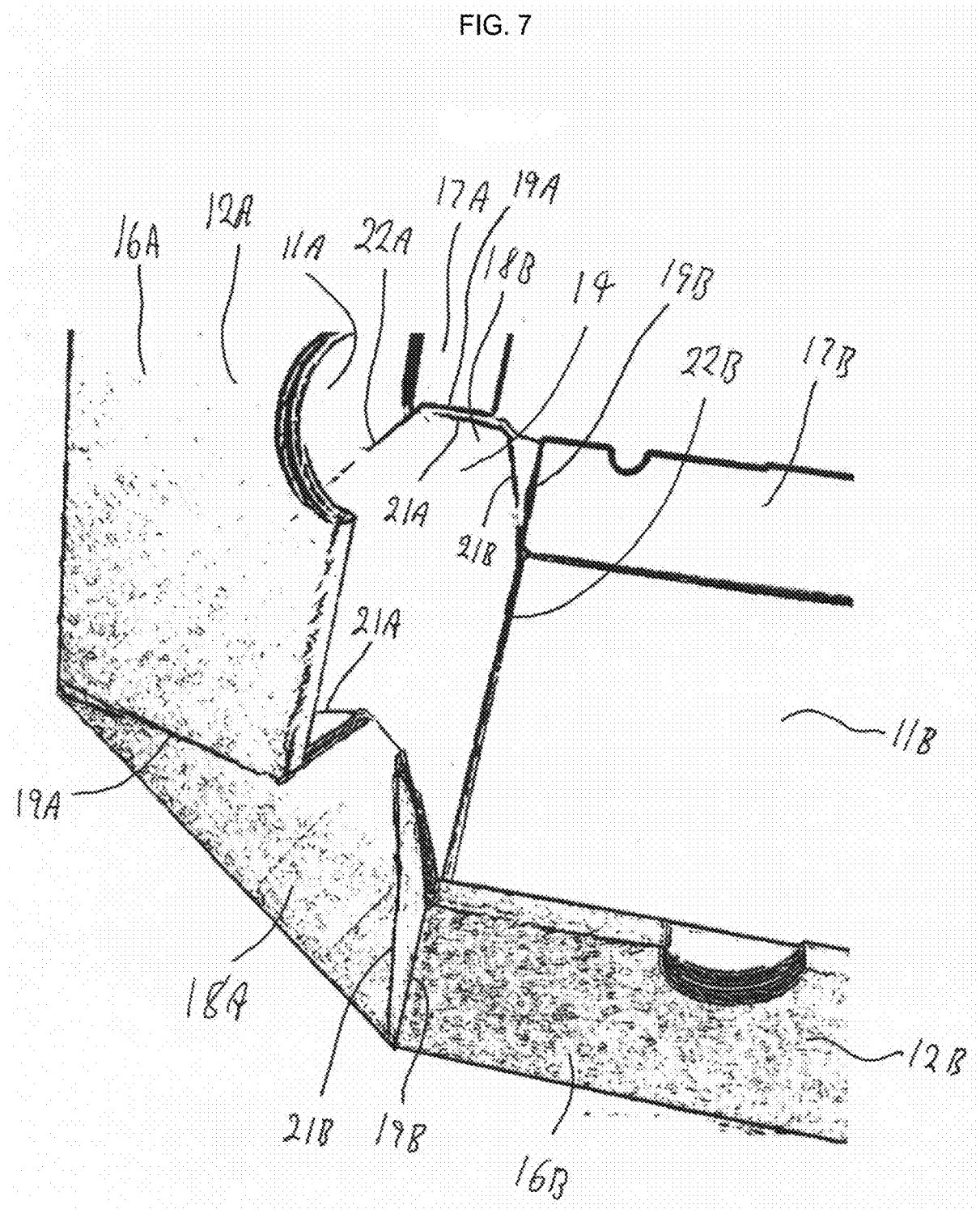
FIG. 7 illustrates a portion of the turf transport and presentation containers of FIGS. 1 to 6 illustrating, in particular, the articulation of the intermediate wall portions about the joining portion.

As illustrated in FIG. 7, the first and second container portions 12A, 12B pivot relative to the joining portion 14 about the join lines 22A, 22B and the intermediate wall portions 18A, 18B fold relative to the end wall portions 16A, 16B, 17A, 17B along the join lines 19A, 19B and also fold along the diagonal fold lines 21A, 21B. The first and second container portions 12A, 12B thereby pivot relative to each other, by articulation, about the joining portion 14 and the intermediate wall portions 18A, 18B thereof between a first configuration and a second configuration.

The first and second container portions 12A, 12B come together in the first configuration in a clam-shell fashion, such that the upper free edges of the end wall portions 16A, 16B, 17A, 17B and the lateral wall portions 15A, 15B come together. In the first configuration, the first and second container portions 12A, 12B define an enclosed cavity 200 as shown in FIG. 1.

The first and second container portions 12A, 12B are pivotable about the joining portion 14 and the intermediate wall portions 18A, 18B from the first configuration to the second configuration to form, together with the joining portion 14, an open tray 30 as illustrated in FIG. 4. Accordingly, the first and second container portions 12A, 12B are openable and closable between the first and second configurations, with the first configuration being a closed configuration and the second configuration being an open configuration.

In the open configuration illustrated in FIG. 4, the bases 11A, 11B of the first and second container portions 12A, 12B and the panel 14A of the joining portion 14 together define a rectangular and planar base 111 of the tray 30. Furthermore, the end wall portions 16A, 16B, 17A, 17B, the lateral wall portions 15A, 15B and the intermediate wall portions 18A, 18B together define a wall 120 extending around a perimeter of the planar base 111 and upstanding therefrom to define the tray 30. The tray 30 is comprised of the first container portion 12A, the joining portion 14 and the second container portion 12B in the second (i.e. open) configuration.

As illustrated in FIG. 7, when the intermediate wall portions 18A, 18B fold along the join lines 19A, 19B and the diagonal fold lines 21A, 21B, portions of the intermediate wall portions 18A, 18B fold over each other to form gussets when the apparatus is in the second (i.e. closed) configuration. When the first and second container portions 12A, 12B are pivoted to the first (i.e. open) configuration, the folded over portions of the intermediate wall portions 18A, 18B open up to form a substantially planar wall member extending between and adjoining the end wall portions 16A, 16B, 17A, 17B to define the wall 120 extending around the perimeter of the planar base 111.

As illustrated in FIG. 3, the apparatus 10 is adapted to contain a sheet of turf or sod 40. The turf sheet 40 may be provided rolled up or otherwise folded and stored within the apparatus 10. The turf sheet 40 may be stored in a sleeve (not shown) for keeping the turf sheet 40 alive and fresh. Preferably, the sleeve comprises ventilation holes or open ends to allow airflow for the turf sheet 40. In addition, the sleeve may prevent dirt, soil or other particulates from leaking from the apparatus 10 during transport. The turf sheet 40 is unrolled or unfolded and laid across the planar base 111 of the tray 30 as shown in FIG. 5. Preferably, the turf sheet 40 is a live piece of natural turf or sod, however, artificial or other turf alternatives may be provided within and used with the apparatus 10. The dimension, shape and/or material of the apparatus 10 and/or each constituent part may be adapted to account for different dimensions of the turf sheet 40.

As explained above, the apparatus 10 is configurable in the first (i.e. closed) configuration as shown in FIG. 1. The first configuration is adapted for containing the turf sheet 40 in the rolled up or folded configuration for storage, transport, delivery and disposal. In the first configuration, the first container portion 12A and the second container portion 12B are arranged opposite each other and substantially orthogonal to the joining portion 14. In a sense, the apparatus 10 forms a clam-shell container whereby a cavity 200 is defined between the first container portion 12A and the second container portion 12B. Accordingly, the depth of the cavity 200 is, in part, determined by the combined heights of the end wall portions 16A, 16B, 17A, 17B and the lateral wall portions 15A, 15B when they are brought together.

As explained above, the apparatus 10 is configurable in the second (i.e. open) configuration as shown in FIGS. 4 and 5. In the second configuration, the first container portion 12A, the joining portion 14 and the second container portion 12B together assume a substantially planar configuration.

In the second configuration, the tray 30 is formed to provide space for the turf sheet 40 to be laid across. Once the turf sheet 40 is unrolled or unfolded the apparatus 10 can be moved to a desired location for use by a pet for excretion of urine or faecal waste. The wall 120 extending around the perimeter of the planar base 111 contains and prevents lateral movement of the turf sheet 40 relative to the tray 30. In some embodiments, the turf sheet 40 may be slightly larger than the tray 30 to provide frictional engagement between the wall 120 and the edge of the turf sheet 40 to further assist with maintaining the turf sheet 40 within the tray 30. Additional retaining means (not shown), which in embodiments includes any one or more of ties, wire or mesh, can be included to retain the turf sheet 40 to the tray 30.

Figure 2:
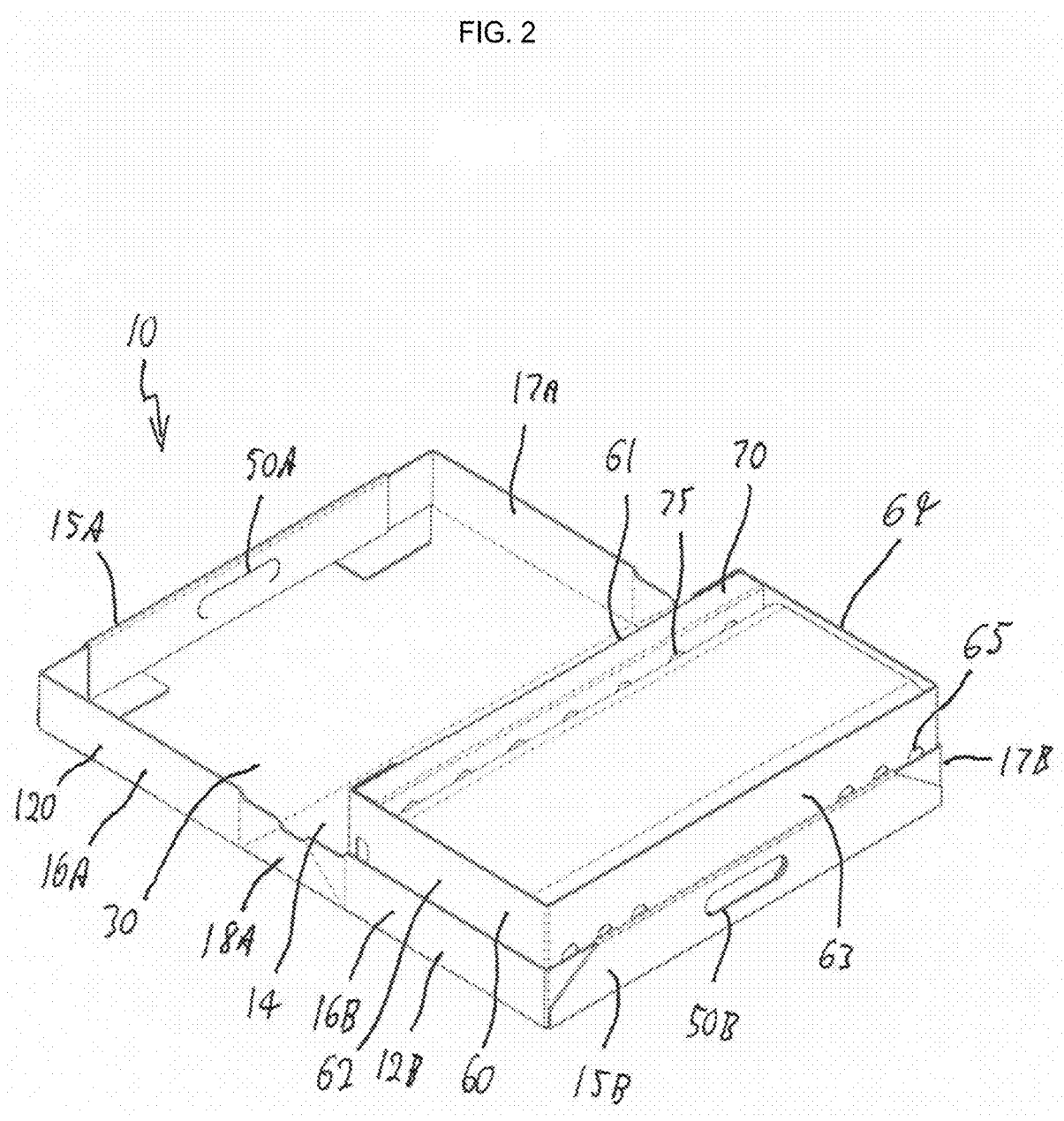
FIG. 2 is the apparatus of FIG. 1 wherein the first container portion, the second container portion and the joining portion are in a second (i.e. open) configuration to form a tray and wherein the apparatus contains an insert, a spacer and a rolled up or folded sheet of turf or sod.

In the embodiment illustrated in FIG. 2, the apparatus 10 comprises an insert 60 and a spacer 70. The insert 60 is comprised of a pair of opposite lateral side walls 61, 63 and a pair of opposite end walls 62, 64, wherein opposite ends of each of the pair of side walls 61, 63 are connected to opposite ends of each of the pair of end walls 62, 64. The resulting insert 60 has the form of a box which is open at the top and bottom ends, or is open at the top end and closed with a planar panel (not shown) at the bottom end. The insert 60 is adapted to be positioned within the first container portion 12A or the second container portion 12B and to be supported on the base 11A, 11B thereof. The dimensions of the lateral wall 61, 63 and end walls 62, 64 are slightly smaller than the dimensions of the base 11A, 11B of the first or the second container portion 12A, 12B into which the insert 60 is located. The side walls 61, 63 and the end walls 62, 64 of the insert 60 are adapted to sit just inside and closely face the surrounding end wall portions 16A, 16B, 17A, 17B, lateral wall portions 15A, 15B of the respective first or second container portions 12A, 12B and the panel 14A of the joining portion 14 when the apparatus 10 is in the first or the second configurations.

The side walls 61, 63 and the end walls 62, 64 of the insert 60 preferably have a height dimension that is slightly smaller than the height dimension of the cavity 200 defined by the first and second container portions 12A, 12B when they are brought together in the first configuration. Accordingly, when in the first (i.e. closed) configuration of FIG. 1, the insert 60 provides additional support and rigidity for the first and second container portions 12A, 12B such that multiple examples of the apparatus 10 can be stacked on top of one another for storage and/or transport and thereby ameliorating damage or deformation of the apparatus 10. The side walls 61, 63 and the end walls 62, 64 of the insert 60 preferably include one or more ventilation holes 65 for allowing air flow to the turf sheet 40.

As further illustrated in FIG. 2, the apparatus can further include one or more spacers 70 that are positioned inside the side walls 61, 63 of the insert 60 that fills a gap between the rolled or folded turf sheet 40 and the side walls 61, 63 of the insert 60. Each spacer 70 is preferably comprised of an elongated member with a hollow box shaped profile. In another embodiment, one or more of the spacers 70 can be positioned inside the lateral wall portions 15A, 15B of the respective first or second container portions 12A, 12B and the panel 14A of the joining portion 14 when the apparatus 10 is in the first or the second configurations.

The spacer 70 can assist with maintaining the turf sheet 40 in a desired location within the cavity 200 and prevent excessive movement therewithin. In an embodiment, a pair of the spacers 70 can be positioned on opposite sides of the rolled up or folded turf sheet 40 to maintain the location of the turf sheet 40 centrally within the cavity 200 during storage and/or transport. The spacer 70 preferably includes one or more ventilation holes 75 for allowing the air flow to the turf sheet 40.

In the first (i.e. closed) configuration, the container portions 12A, 12B are releasably secured in place relative to each other. In an embodiment, the container portions 12A, 12B are releasably secured together by adhesive, tape, seal or releasable pull tabs. Once the initial securing of the container portions 12 has been released or otherwise broken, the apparatus 10 may still be returned to a transportable configuration but may require new means to secure the container portions 12 in place relative to each other. Returning the container portions 12 into the transportable configuration may be beneficial when replacing and disposing of an old apparatus 10.

Referring to FIGS. 1 to 5, the apparatus 10 further includes an opening 50A, 50B through each one of the lateral wall portions 15A, 15B of the container portions 12A, 12B for use as handholds when the apparatus is in the first (i.e. closed) configuration. When the apparatus 10 is in the first configuration, the openings 50A, 50B can be grasped in one hand to lift and otherwise handle the apparatus 10 during transport. When in the second (i.e. open) configuration, a user can grasp one or both of the openings 50A, 50B to move the apparatus 10 to a desired location. The openings 50A, 50B are provided by partial cut-outs through the lateral wall portions 15A, 15B that can be folded inwards to open up the openings 50A, 50B.

Figure 6:
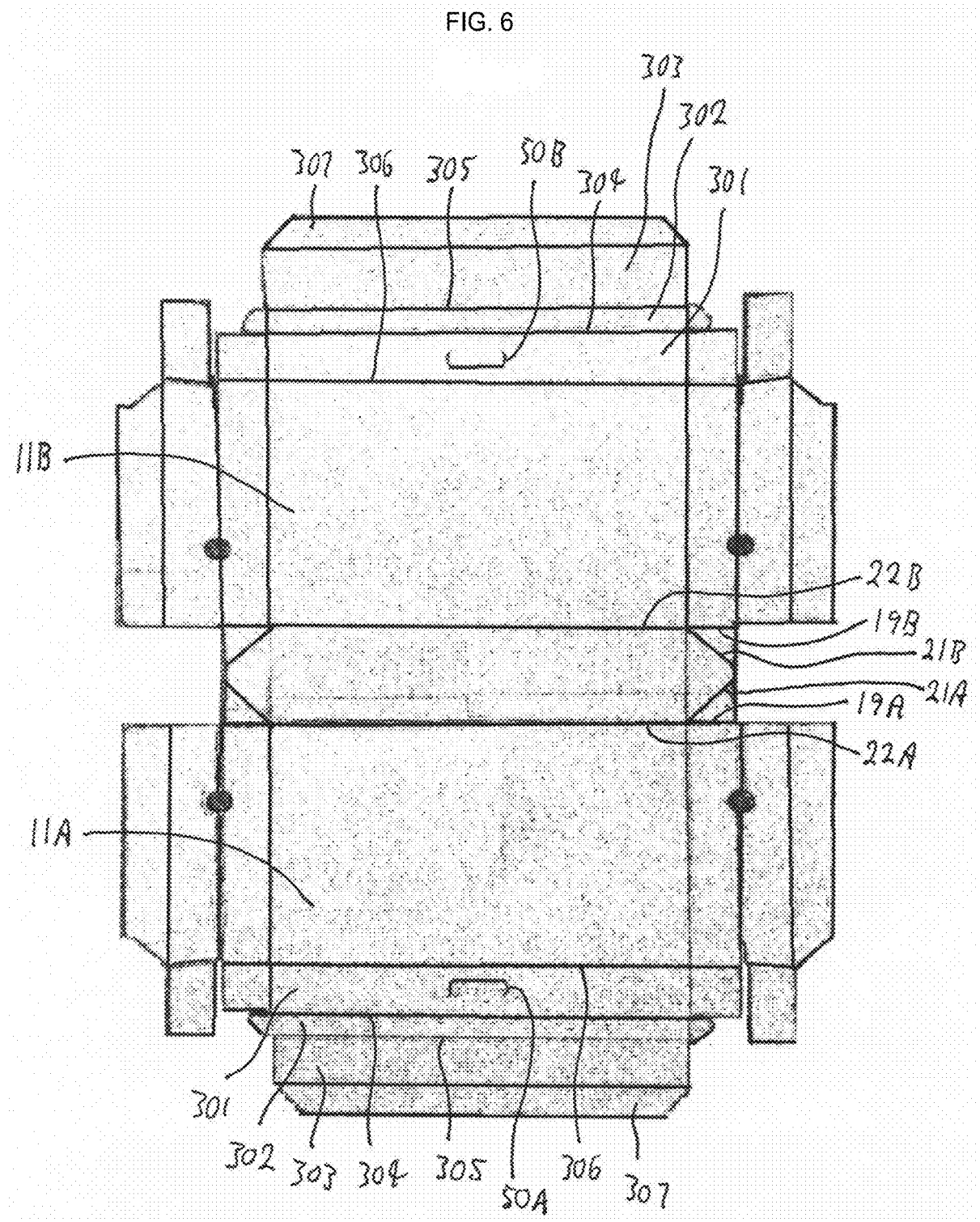
FIG. 6 illustrates a turf transport and presentation container blank in accordance with an embodiment of the invention.

Preferably, the apparatus 10 is formed from a cardboard blank 300, and embodiment of which is illustrated in FIG. 6 which includes the features of the apparatus 10 described above with respect to the embodiment of FIGS. 1 to 5. Therefore, like reference numerals are used to identify like features. Furthermore, the lateral wall portions 15A, 15B upstanding from the lateral edge of each base 11A, 11B are each formed of first and second upstanding panels 301, 303 and an intermediate panel 302. The intermediate panel 302 is between the first and second upstanding panels 301, 303 and adjoins the first upstanding panel 301 along a first fold line 304 and adjoins the second upstanding panel along 303 along a second fold line 305. Further, the first upstanding panel 301 adjoins the base 11A, 11B of a respective one of the container portions 12A, 12B along a third fold line 306. The lateral wall portions 15A, 15B are formed from the blank 300 by pivoting the first upstanding panel 301 about the third fold line 306, pivoting the intermediate panel 302 about the first fold line 304 and pivoting the second upstanding panel 303 about the second fold line 305. The first and second upstanding panels 301, 303 and the intermediate panel 302 thereby form a channel comprising an open box shaped profile. Advantageously, the resulting box shaped profile of the channel forming the lateral wall portions 15A, 15B provides structural rigidity and support to withstand forces due to use of the openings 50A, 50B within the lateral wall portions 15A, 15B as hand holds.

Preferably the intermediate panel is in a plane substantially parallel with a plane of the base 11A, 11B of the respective container portions 12A, 12B. A lip extension portion 307 adjoins the second upstanding panel 303 along a fourth fold line 308 and is preferably folded underneath or in another embodiment is folded away from underneath the intermediate panel 303 for further strengthening of the box shaped profile of the channel forming the lateral wall portions 15A, 15B.

In an embodiment the cardboard blank 300 includes a waterproof or water-resistant coating on the surface that will become the inward facing surface of the apparatus defining the cavity 200. In embodiments, the coating is preferably a paraffin wax, otherwise preferably a polymer including as polyethylene or is preferably impregnated with a material that imparts a waterproof or water-resistant property to the cardboard. The waterproof or water-resistant properties of this embodiment reduce and/or eliminate absorption of fluid by the apparatus 10 from the turf 40.

The apparatus 10 and/or the inserts 60 and/or the spacers 70 not including the turf sheet 40 may be constructed from a single piece of material. The individual components may be separable and constructed from the single piece of material. The single piece may comprise a number of foldable perforations for indicating where to be folded. Accordingly, the tray 30 and one or more wall portions may be assembled by a folding of the material in a predetermined order.

The apparatus 10, excluding the turf sheet 40, may comprise of a single material or a combination of materials. The apparatus 10, excluding the turf sheet 40 may comprise a material including, but not limited to, cardboard, plastics, pulp moulds, recycled polyethylene terephthalate (rPET) or other materials known in the art.

The method of deploying will now be described with reference to the Figures generally.

When deploying the apparatus 10 a turf for presentation for pet toiletry, the user must first separate the container portions 12A, 12B. This may comprise cutting a piece of tape, pulling a releasable tab, applying sufficient pressure to break a temporary adhesive. Once separated, the user need only move one of the container portions 12A, 12B in an arcuate motion relative the other one of the container portions 12A, 12B. Preferably, the apparatus 10 is being deployed on a relatively flat surface. The user moves one of the container portions 12A, 12B through an arcuate motion from the first (i.e. closed) configuration until each of the container portions 12A, 12B and the joining portion 14 are positioned in the same plane and flat, namely the second (i.e. open) configuration. In the open configuration, the apparatus 10 comprises the wall 120 extending around the perimeter of the planar base 111.

If there are inserts 60 and/or spacers 70 present, they may be removed and recycled or otherwise disposed of. If the turf sheet 40 is provided in a sleeve, the user may remove the turf sheet 40 from the sleeve and place in the tray 30. The user then need only unroll or unfold the turf sheet 40 and move the turf sheet 40 onto the planar base 111 so as to be bound by the wall 120. Preferably, the turf sheet 40 when laid out substantially covers the planar base 120.

The method of deployment from the first configuration to the second configuration is seen in FIGS. 1 to 5 and 7.

After a certain period of time or when the turf sheet 40 reaches a certain condition, the user may reverse the process placing the apparatus 10 back into the first configuration. From here the user may grasp the apparatus 10 by the openings 50A, 50B and carry it away for disposal.

The invention has advantages with storage, transport, delivery, use and disposal of the apparatus 10. The configuration of the apparatus 10 allows a small footprint for transportation while retaining more than double the area of one of the container portions 12 for presenting as a pet toileting area. In addition, the addition of the inserts has improved the ability for the apparatus 10 to be shipped with little to no damage.

The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

The invention claimed is:

1. A turf transport and presentation apparatus for pet toiletry, the apparatus including:
   a first container portion;
   a second container portion, each of the first and the second container portions comprising a base and a wall upstanding from the base;
   a joining portion connecting the first and second container portions together, wherein the joining portion includes:
      a panel connected with a lateral edge of the base of each of the container portions; and
      intermediate wall portions connected with the walls of each of the container portions; and
   a turf sheet for being laid across the first container portion, the second container portion and the joining portion;
   wherein the first and second container portions are adapted to pivot relative to each other about the joining portion between:
      a first configuration in which the first and second container portions are closed together whereby the bases and upstanding walls of the first and second container portions and the panel of the joining portion define a cavity for containing a sheet of turf for storage or transport, and upper free edges of the walls of the first container portion abut with upper free edges of the walls of the second container portion, and
      a second configuration in which the first and second container portions are opened apart whereby the bases and the upstanding walls of the first and second container portions and the panel and intermediate wall portions of the joining portion provide a unitary planar base surrounded by a unitary upstanding wall.

2. The apparatus according to claim 1, wherein the unitary planar base and the surrounding unitary upstanding wall define a tray in the second configuration.

3. The apparatus according to claim 1, wherein the first container portion, the second container portion and the joining portion define a clamshell container in the first configuration.

4. The apparatus according to claim 1, wherein the intermediate wall portions upstand from opposite ends of the panel and adjoin the walls of each of the container portions along join lines, wherein the intermediate wall portions each include diagonal fold lines extending from a junction between the join lines and the base of a respective first or second container portion, whereby portions of the intermediate wall portions either side of the diagonal fold lines fold over each other to form gussets when the apparatus is in the second configuration.

5. The apparatus according to claim 4, wherein the portions of the intermediate wall portions either side of the diagonal fold lines unfold from over each other gussets when the apparatus assumes the first configuration whereby the intermediate wall portions assume a planar configuration upstanding from the panel to form together with the walls of each of the container portions to form the unitary upstanding wall surrounding the unitary planar base.

6. The apparatus according to claim 4, wherein the diagonal fold lines extend at about 45 degrees relative to the join lines between opposite ends of the panel and the adjoining walls of each of the container portions.

7. The apparatus according to claim 1, wherein the wall joint portion is collapsible so as to be substantially coplanar to the surface of the joining portion.

8. The apparatus according to claim 1, wherein the upstanding walls of the first and second container portions are each comprised of a first upstanding panel, a second upstanding panel spaced apart and substantially parallel to the first upstanding panel, and an intermediate panel adjoining and extending between the first and second upstanding panels thereby forming a channel comprising an open box shaped profile.

9. The apparatus according to claim 1, wherein the upstanding walls of the first and second container portions each include openings for use as hand holds.

10. The apparatus according to claim 9, wherein the openings are positioned on each of the upstanding walls of the first and second container portions closely opposite and in alignment with each other when the first and second container portions in the first configuration.

11. The apparatus according to claim 8, wherein openings for use as hand holds are located within one of the first and second upstanding panels.

12. The apparatus according to claim 1, wherein the apparatus further comprises one or more spacers.

13. The apparatus according to claim 12, wherein the apparatus further comprises one or more inserts.

14. The apparatus according to claim 13, wherein the spacers or inserts increase the rigidity of the apparatus in the first configuration.

15. The apparatus according to claim 12, wherein the spacers or inserts are locatable to position the turf sheet within the cavity in the first configuration.

16. The apparatus according to claim 1, further including a water-resistant sleeve for containing the turf sheet within the cavity.

17. The apparatus according to claim 1, wherein the first container portion and the second container portion are releasably secured together in the first configuration.

18. The apparatus according to claim 1, wherein the material forming the container is cardboard and includes a waterproof or water-resistant material or coating.

19. A container blank configured to form the turf transport and presentation apparatus of claim 1.

* * * * *